United States Patent Office 3,442,978
Patented May 6, 1969

3,442,978
PREPARATION OF BLOCK COPOLYMERS OF PROPYLENE AND ETHYLENE
Habet M. Khelghatian, Springfield, and James L. Jezl, Swarthmore, Pa., and Louise D. Hague, Wilmington, Del., assignors to Avisun Corporation, Philadelphia, Pa., a corporation of Delaware
No Drawing. Continuation-in-part of application Ser. No. 244,281, Dec. 13, 1962. This application May 16, 1966, Ser. No. 550,110
The portion of the term of the patent subsequent to Aug. 23, 1983, has been disclaimed
Int. Cl. C08f 45/68, 19/00, 15/00
U.S. Cl. 260—878  9 Claims

ABSTRACT OF THE DISCLOSURE

This invention relates to the preparation of block copolymers of propylene and ethylene, and more particularly to the preparation of block copolymers of propylene and ethylene containing a plurality of blocks of copolymers which possess tensile impact strength and clarity far superior to polypropylene or to block polymers of ethylene and propylene of equivalent flow rate known to the art. The block copolymers of this invention are further characterized in that they contain between about 1.5 mol percent and about 15 mol percent of ethylene. The block copolymers of this invention are prepared by polymerizing propylene or a mixture of propylene and about 1.0 mol percent to about 5 mol percent ethylene in a first phase. Thereafter, without purging unreacted monomer, or monomers, from the system, polymerization is continued with ethylene or a propylene-ethylene mixture containing more ethylene than the first-mentioned mixture, i.e., in the range between about 20 mol percent and 100 mol percent ethylene. These two phases may be repeated in a continuous fashion.

CROSS-REFERENCE

This application is a continuation-in-part of application Ser. No. 244,281, now abandoned, filed Dec. 13, 1962.

BACKGROUND OF THE INVENTION

Block copolymers of ethylene and propylene which consist of alternating segments of ethylene and propylene homopolymers have been described by Natta et al. in Italian Patent 615,048 and in "Journal of Polymer Science," 34 542–3, 1959. Such polymers are prepared by first polymerizing one monomer, eliminating unreacted monomer, then polymering the second monomer, eliminating the second monomer, and repeating the process. Such block polymers have reasonably good brittle points and impact strength, but are deficient in tensile strength as compared to polypropylene. Belgian Patent 612,526 discloses two-segment block polymers in which the first segment is a homopolymer of propylene and the second segment is either a homopolymer of ethylene or a copolymer of ethylene and propylene. The block polymers of the Belgian patent also posses low brittle points and high impact strength, and in addition, have tensile strengths approaching that of polypropylene.

Both of these types of block copolymers, as well as polypropylene itself, are deficient in clarity, however. In thin films having a thickness of about one mil, the lack of clarity is not a problem since films of this thickness appear to the eye to be perfectly clear. Films and sheets of greater thickness are, however, cloudy, and it is quite difficult to discern the liquid level in bottles made from these materials. The polymers of the present invention, as distinguished from those of the prior art described above, make possible relatively thick molded objects having greater improved clarity.

DESCRIPTION OF THE INVENTION

It is the object of this invention to provide block copolymers of ethylene and propylene which have a low brittle point, high impact strength and tensile strength approaching that of polypropylene, and which in addition have much greater clarity than any of the propylene-containing olefin polymers known to the prior art.

The test for clarity used herein is as follows:

The polymer to be tested for clarity is molded into sheets ⅛ inch in thickness. The sheet is then placed over and in contact with a copy of a U.S. patent having a type size that of patents issued in 1962. If the type, viewed through the sheet, does not appear to be at all blurred, the sheet is given a clarity rating of 1. If the type appears to be slightly blurred, but can still be read easily, the clarity rating is 2. If the type appears to be more blurred than it appears viewed through a sheet with clarity rating of 2, but can still be read without great difficulty, the sheet is given a rating of 3. When using a sheet with a clarity rating of 4, the type is quite blurred and is difficult to read. When viewed through a sheet with clarity rating of 5, the type is very blurred and can be distinguished only with great difficulty. With a sheet of clarity rating 6, the type cannot be distinguished at all.

The block copolymers of the present invention have, in a large part, clarities of 1, although some, particularly those with a high ethylene content, may have clarity ratings of 2. In contrast, polypropylene has a clarity rating of 3, and the block polymers of the prior art have clarity ratings of from 4 to 6.

In accordance with the present invention, we first polymerize a propylene-rich feed containing from about 1.0 mol percent to about 5 mol percent ethylene for a period of time. This feed is then stopped, and a second feed which is richer in ethylene is passed into the reactor and is polymerized as an extension onto the first-formed copolymer. This procedure may be repeated a number of times to yield a polymer having a number of segments in which the odd-numbered segments consist of a random copolymer rich in propylene, and the even-numbered segments consist of a random copolymer richer in ethylene than the odd-numbered segments. The second feed may contain from 20 mol percent to 100 mol percent ethylene, the balance being propylene, but even when the feed is 100% ethylene, the even-numbered segments will be copolymers, since the reactor will contain unreacted propylene during the periods when the feed is ethylene.

The total amount of ethylene introduced into the block polymer formed as a final product should be sufficient to provide from about 1.5 mol percent to about 15 mol percent of ethylene in the final product, preferably not higher than 10 mol percent.

The catalyst used in the copolymerization is not critical, and may be any catalyst known to polymerize propylene to a crystalline, or crystallizable, polymer. Such catalysts include halides of the transition metals in combination with organometallic compounds of the Group I–III metals, such as the combination of titanium trichloride and triethyl aluminum or aluminum diethyl monochloride. Many examples of such catalysts are given on pages 350–367 of "Linear and Stereoregular Addition Polymers," by Gaylord and Mark, Interscience Publishers, 1959, the contents of which are incorporated herein by reference. It is preferred, however, to use catalysts containing as a third component a coordinating compound such as an ether, an amine, a quaternary ammonium compound, or an alkoxysilane, in combination with titanium trichloride and an alkyl aluminum dihalide or a dialkyl aluminum monohalide, since these catalyst systems produce a smaller percentage of byproduct pentane-soluble polymer than do the uncoordinated catalyst systems.

Examples of such three component catalyst systems are titanium trichloride, diethyl aluminum chloride and the dimethyl ether of diethylene glycol; titanium trichloride, ethyl aluminum dichloride and triethylene diamine; titanium trichloride, diethyl aluminum chloride and triethyl amine; titanium trichloride, ethyl aluminum dichloride and methyl tetrahydrofuran; or titanium trichloride, aluminum ethyl dichloride and ethyl orthosilicate. In these systems the atomic ratio of aluminum to titanium should be from about 0.2:1 to 10:1, and, if a further coordinating compound is used as a catalyst component, the mol ratio of the aluminum compound to the coordinating compound should be from about 5:4 to about 6:1, except in the case of glycol diethers, in which case the mol ratio of the aluminum compound to the glycol ether should be in the range of 200:1 to about 30:1.

Preferred inert solvents for the reaction include saturated hydrocarbons such as hexane, heptane, or octane, although higher boiling saturated hydrocarbons, olefins other than terminal olefins, and aromatic hydrocarbons may also be used. Reaction conditions include temperatures of from ambient to 250° F., preferably in the neighborhood of 160° F., and pressures from atmospheric to 500 p.s.i.g., preferably from about 60 p.s.i.g. to 150 p.s.i.g. If desired, a small amount of hydrogen may be added to the reactor to control flow rate. In order that those skilled in the art may more fully understand the nature of our invention and the manner of carrying it out, the following examples are given.

The physical properties of the polymers of the examples were determined as follows: flow rate by the procedure outlined for determining the melt index of polyethylene in ASTM D1238–57T, except that a temperature of 230° C. is used; tensile impact by ASTM D1822–61T; brittle point by ASTM D746–57T; Izod impact by ASTM D256–56; tensile strength, yield strength, tensile modulus and percent elongation by ASTM D638–58T; and flexural modulus by ASTM D790–59T.

Example I

Copolymerization was carried out in accordance with the following procedure. A pressure reactor fitted with stirring means was flushed with nitrogen and was partially filled with hexane. The catalyst, which consisted of diethyl aluminum chloride, titanium trichloride, and the dimethyl ether of diethylene glycol in a mol ratio of 2:1:0.03, was then added in an amount such that the hexane contained 0.035 gram of titanium trichloride per 100 cc. of hexane. The contents of the reactor were then brought to a temperature of 160° F., hydrogen was added in an amount of 22 parts per million by weight based on the weight of the hexane, and a mixture of 3 mol percent ethylene and 97 mol percent propylene was pressured in at 75 p.s.i.g. Polymerization started immediately, and was continued for 12 minutes, while maintaining the pressure constant by the addition of the mixture. This feed was then discontinued and a second feed consisting of ethylene alone was pressured into the reactor for 1 minute, after which flow of the first feed to the reactor was resumed. This was repeated several times, the entire polymerization cycle being as follows.

| Feed: | Time in minutes |
|---|---|
| 1st | 12 |
| 2nd | 1 |
| 1st | 25 |
| 2nd | 3 |
| 1st | 47 |
| 2nd | 3 |
| 1st | 52 |
| 2nd | 4 |
| 1st | 20 |

The reaction was then stopped by the addition of methanol, and a solid crystalline polymer was recovered from the reaction products by filtration.

Example II

The procedure of Example I was followed, except that the polymerization cycle was—

| Feed: | Time in minutes |
|---|---|
| 1st | 14 |
| 2nd | 3 |
| 1st | 17 |
| 2nd | 3 |
| 1st | 26 |
| 2nd | 7 |
| 1st | 26 |
| 2nd | 8 |
| 1st | 16 |

The products were worked up as in Example I.

Example III

The same procedure was followed, in the following cycle. 20 p.p.m. of hydrogen were used.

| Feed: | Time in minutes |
|---|---|
| 1st | 20 |
| 2nd | 8 |
| 1st | 27 |
| 2nd | 15 |
| 1st | 45 |
| 2nd | 19 |
| 1st | 56 |

Example IV

The same general procedure was followed as in the preceding examples, except that the second feed consisted of a mixture of 26 mol percent ethylene and 74 mol percent propylene. Hydrogen was present in the amount of 18 p.p.m. based on the weight of hexane.

The polymerization cycle was as follows:

| Feed: | Time in minutes |
|---|---|
| 1st | 13 |
| 2nd | 9 |
| 1st | 12 |
| 2nd | 7 |
| 1st | 16 |
| 2nd | 18 |
| 1st | 25 |
| 2nd | 24 |
| 1st | 30 |

Example V

The feeds and hydrogen level were the same as in Example IV, but the following polymerization was used.

Feed: Time in minutes
- 1st ___ 31
- 2nd ___ 18
- 1st ___ 5
- 2nd ___ 13
- 1st ___ 3
- 2nd ___ 13
- 1st ___ 6
- 2nd ___ 23
- 1st ___ 1

Example VI

The same general procedure as in the preceding examples was followed, except that the second feed was a mixture of ethylene and propylene containing 51 mol percent ethylene, and hydrogen was initially added in the amount of 22 p.p.m. based on the weight of hexane. The following polymerization cycle was used.

Feed: Time in minutes
- 1st ___ 10
- 2nd ___ 2
- 1st ___ 14
- 2nd ___ 2
- 1st ___ 29
- 2nd ___ 3
- 1st ___ 50
- 2nd ___ 3
- 1st ___ 22

Example VII

Example VI was repeated using the following polymerization cycle.

Feed: Time in minutes
- 1st ___ 7
- 2nd ___ 4
- 1st ___ 4
- 2nd ___ 3
- 1st ___ 9
- 2nd ___ 3
- 1st ___ 8
- 2nd ___ 4
- 1st ___ 4

Example VIII

Example VI was repeated, except that the following polymerization cycle was used with 18 p.p.m. of hydrogen based on the weight of hexane.

Feed: Time in minutes
- 1st ___ 11
- 2nd ___ 6
- 1st ___ 5
- 2nd ___ 3
- 1st ___ 5
- 2nd ___ 4
- 1st ___ 5
- 2nd ___ 4
- 1st ___ 3

Example IX

The procedure of the following examples was followed, except that the second feed was an ethylene-propylene mixture containing 72 mol percent ethylene, and the following polymerization cycle was used, with 20 p.p.m. of hydrogen based on the weight of hexane.

Feed: Time in minutes
- 1st ___ 17
- 2nd ___ 31
- 1st ___ 50
- 2nd ___ 96

Example X

Example IX was repeated, except that the following polymerization cycle was used.

Feed: Time in minutes
- 1st ___ 34
- 2nd ___ 31
- 1st ___ 36
- 2nd ___ 31
- 1st ___ 80

Example XI

The general procedure of the foregoing examples was followed, except that the second feed was a mixture of ethylene and propylene containing 79 mol percent ethylene. The following polymerization cycle was used.

Feed: Time in minutes
- 1st ___ 17
- 2nd ___ 23
- 1st ___ 10
- 2nd ___ 9
- 1st ___ 7
- 2nd ___ 17
- 1st ___ 18
- 2nd ___ 20
- 1st ___ 6

Example XII

In this run the reaction conditions were temperature 160° F. and propylene pressure 75 p.s.i.g. The catalyst was a complex of ethyl aluminium dichloride, titanium trichloride and ethyl orthosilicate in a mol ratio of 2:1:0.65. The level of titanium trichloride in the hexane solvent was 0.07 gram per 100 cc. The first feed was 2.5 mol percent ethylene and 97.5 mol percent propylene, the second feed was 71 mol percent ethylene and 29 mol percent propylene. 17 p.p.m. of hydrogen, based on the weight of hexane, was used. The polymerization cycle was as follows.

Feed: Time in minutes
- 1st ___ 104
- 2nd ___ 16

Properties of the entire product of the polymerization of the examples and of the portion insoluble in boiling pentane are given in the following table.

TABLE

| Ex. | Mol Percent C₂ TP | Wt. Percent PS | FR | Clarity | BP | II | TI | YS | TS | E | TM | FM |
|---|---|---|---|---|---|---|---|---|---|---|---|---|
| 1 | 5.5 | 12 | 3.0 | 1 | +4.5 | 0.63 | 29.8 | 3,900 | 4,300 | 377 | 137,000 | 144,000 |
| 2 | 9.1 | 27 | 3.1 | 1 | -2.0 | 0.61 | 46.7 | 3,600 | 4,100 | 382 | 109,000 | 118,000 |
| 3 | 11.5 | 30 | 1.8 | 2 | -9.0 | 1.30 | 47.3 | 3,500 | 4,300 | 376 | 106,000 | 120,000 |
| 4 | 4.0 | 18 | 2.0 | 1 | -2.0 | 0.89 | 52.7 | 3,700 | 4,800 | 421 | 87,000 | 110,000 |
| 5 | 9.1 | 25 | 2.1 | 2 | -13.8 | 1.33 | 66.6 | 3,200 | 4,100 | 389 | 73,000 | 108,000 |
| 6 | 4.2 | 10 | 3.0 | 1 | +6.5 | 0.51 | 24.7 | 4,300 | 4,800 | 471 | 125,000 | ND |
| 7 | 5.7 | 26 | 2.9 | 1 | -9.0 | 0.95 | 68.9 | 3,200 | 4,400 | 438 | 73,000 | 90,000 |
| 8 | 15.0 | 38 | 1.6 | 1 | -12.0 | ND | ND | ND | ND | ND | ND | ND |
| 9 | 7.5 | 14 | 2.9 | 2 | -3.0 | 0.55 | 21.8 | 4,000 | 4,900 | 411 | 116,000 | ND |
| 10 | 15.2 | 33.6 | 0.9 | 2 | -7.0 | ND | ND | ND | ND | ND | ND | ND |
| 11 | 21.2 | 62 | 1.3 | 2 | -15.5 | ND | ND | ND | ND | ND | ND | ND |
| 12 | 5.8 | 19 | 1.9 | 2 | -1.8 | ND | 42 | ND | ND | ND | ND | ND |

TP—Total product. PS—Pentane soluble portion of product. FR—Flow rate. BP—Brittle point, ° C. II—Izod impact. TI—Tensile impact. YS—Yield, p.s.i., 1.0″/min. TS—Tensile, p.s.i., strength 1.0″/min. E—Percent elongation, 1.0″/min. TM—Tensile modulus. FM—Flexural modulus.

In another experiment ethylene and propylene were alternately polymerized to yield a polymer having four blocks each of ethylene and propylene, and an ethylene content of 14.5 mol percent. The reactor was purged with nitrogen after each monomer had been polymerized to remove unreacted monomer and avoid the presence of any random copolymer in the product. The product had a brittle point of −6° C. and a yield strength of 3290, but had a clarity rating of 6.

In still another experiment, a terminal block copolymer was made by first polymerizing propylene alone under the conditions of the foregoing examples, for 85 minutes, followed by polymerization of a second feed of a mixture of ethylene and propylene containing 23 mol percent ethylene for 85 minutes. The total product contained 8.4 mol percent ethylene, and the pentane-insoluble portion had a brittle point of −13.5 and tensile impact of 94, but had a clarity rating of 5.

The invention claimed is:

1. A process for the preparation of block copolymers of propylene and ethylene which comprises contacting, in an inert hydrocarbon reaction medium, a first feed consisting of a mixture of propylene and between 1.0 mol percent and 5 mol percent ethylene with a catalyst capable of polymerizing propylene to a crystalline polymer; discontinuing the flow of said first feed; and thereafter, without purging unreacted monomers from the system, contacting the catalyst, in the presence of unreacted monomers, with a second feed selected from the group consisting of ethylene and ethylene-propylene mixtures containing between about 20 mol percent and 100 mol percent ethylene; and recovering a substantially crystalline block copolymeric final product containing between about 1.5 mol percent and 15 mol percent ethylene and having a low brittle point, a higher tensile impact strength, and greater clarity than polypropylene of equivalent flow rate said block copolymeric product additionally having greater clarity than block copolymers of propylene and ethylene wherein at least one block of an adjacent pair of blocks is a homopolymer block derived from propylene or ethylene.

2. The process of claim 1 in which the ethylene content in said final product is no higher than 10 mol percent.

3. The process of claim 1 in which the first and second feeds are serially alternated so as to produce a product having between about 2 and about 9 copolymer blocks, the odd-numbered copolymer blocks being rich in polymerized propylene and lean in polymerized ethylene and the even-numbered copolymer blocks being richer in polymerized ethylene than the odd-numbered ones.

4. The process of claim 3 wherein said final product contains between about 4 and about 9 copolymer blocks.

5. The process of claim 3 wherein the catalyst comprises a titanium trihalide and an organoaluminum compound.

6. The process of claim 5 wherein the catalyst comprises a titanium trihalide, an alkyl aluminum dihalide, and an alkoxysilane.

7. The process of claim 4 in which the catalyst comprises a titanium trihalide and an organoaluminum compound.

8. The process of claim 7 in which the catalyst comprises a titanium trihalide, an alkyl aluminum dihalide and an alkoxysilane.

9. The process of claim 8 wherein the ethylene content in said final product is no higher than 10 mol percent.

References Cited

UNITED STATES PATENTS

| | | | |
|---|---|---|---|
| 3,268,624 | 8/1966 | Jezl et al. | 260—878 |
| 3,301,921 | 1/1967 | Short | 260—878 |

FOREIGN PATENTS

| | | |
|---|---|---|
| 1,258,741 | 3/1961 | France. |

MURRAY TILLMAN, *Primary Examiner.*

J. T. GOOLKASIAN, *Assistant Examiner.*